(12) United States Patent
McCannel et al.

(10) Patent No.: US 8,009,359 B2
(45) Date of Patent: Aug. 30, 2011

(54) LENTICULAR CONTAINER AND METHOD OF MAKING

(75) Inventors: Duncan A. McCannel, Eagan, MN (US); John Tomczyk, Shoreview, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 11/409,284

(22) Filed: Apr. 20, 2006

(65) Prior Publication Data
US 2007/0024980 A1 Feb. 1, 2007

(51) Int. Cl.
*G02B 27/10* (2006.01)
(52) U.S. Cl. .......... 359/619; 359/620; 359/627
(58) Field of Classification Search .......... 359/619–633
See application file for complete search history.

(56) References Cited

U.S. PATENT DOCUMENTS

| | | | |
|---|---|---|---|
| 2,942,530 A | 6/1960 | Bodendoerfer | |
| 2,965,274 A * | 12/1960 | Brillis et al. | 229/400 |
| 3,057,537 A * | 10/1962 | Pollick | 229/404 |
| 3,836,039 A | 9/1974 | Seiferth | |
| 3,837,775 A | 9/1974 | Boucher | |
| 3,854,583 A * | 12/1974 | Amberg et al. | 206/520 |
| 4,349,345 A | 9/1982 | Bodendoerfer | |
| 4,490,130 A | 12/1984 | Konzal et al. | |
| 4,802,295 A | 2/1989 | Darr | |
| 4,920,039 A | 4/1990 | Fotland | |
| 5,425,497 A * | 6/1995 | Sorensen | 220/738 |
| 5,525,383 A | 6/1996 | Witkowski | |
| 5,569,143 A | 10/1996 | Konzal | |
| 5,624,367 A | 4/1997 | Budziszewski | |
| 5,752,907 A | 5/1998 | Konzal | |
| 5,753,344 A | 5/1998 | Jacobsen | |
| 5,967,032 A | 10/1999 | Bravenec et al. | |
| 5,967,302 A | 10/1999 | Lin | |
| 6,001,208 A | 12/1999 | Kinoshita et al. | |
| 6,084,713 A | 7/2000 | Rosenthal | |
| 6,150,013 A | 11/2000 | Balaji et al. | |
| 6,158,612 A | 12/2000 | Alpert | |
| 6,182,855 B1 | 2/2001 | Alpert | |
| 6,251,566 B1 | 6/2001 | Brosh et al. | |

(Continued)

FOREIGN PATENT DOCUMENTS

DE 19731315 1/1999
(Continued)

OTHER PUBLICATIONS

Jack Kenny, "In-Mold Labeling," Label and Narrow Web, Jan. 2003, 3 pgs.

(Continued)

*Primary Examiner* — Joseph P Martinez
*Assistant Examiner* — Brandi N Thomas
(74) *Attorney, Agent, or Firm* — Patterson Thuente Christensen Pedersen, P.A.

(57) ABSTRACT

The present disclosure relates to a lenticular display article, such as a container, and a method of making the article. The article includes a lenticular sidewall, which defines a cavity having a top end, and a bottom end, the sidewall having a seam; and an optional base attached to the bottom end of the sidewall. The method of making the article can includes forming a frustoconical sidewall having a seam joining the opposite ends and optionally affixing a base to the bottom end of a lenticular sidewall. Alternatively, the bottom end of the sidewall may be sealed to itself to form a baseless tube.

20 Claims, 2 Drawing Sheets

U.S. PATENT DOCUMENTS

| | | | |
|---|---|---|---|
| 6,267,550 B1 | 7/2001 | Morgan | |
| 6,382,449 B1 | 5/2002 | Kazmierski et al. | |
| 6,424,467 B1 | 7/2002 | Goggins | |
| 6,490,063 B1 | 12/2002 | Imajo | |
| 6,490,092 B1 | 12/2002 | Goggins | |
| 6,490,093 B2 * | 12/2002 | Guest | 359/619 |
| 6,544,634 B1 | 4/2003 | Abrams et al. | |
| 6,551,685 B1 | 4/2003 | Wojewoda et al. | |
| 6,635,196 B1 | 10/2003 | Goggins | |
| 6,652,435 B1 | 11/2003 | Sand | |
| 6,781,761 B2 | 8/2004 | Raymond | |
| 6,790,168 B1 | 9/2004 | Sand | |
| 6,943,953 B2 * | 9/2005 | Raymond | 359/619 |
| 6,966,296 B2 | 11/2005 | Miyazaki et al. | |
| 7,153,555 B2 | 12/2006 | Raymond et al. | |
| 2002/0111260 A1 | 8/2002 | Sand | |
| 2002/0114080 A1 | 8/2002 | Guest | |
| 2002/0121456 A1 * | 9/2002 | Mannion et al. | 206/806 |
| 2002/0192461 A1 | 12/2002 | Anderson et al. | |
| 2003/0094891 A1 | 4/2003 | Lin | |
| 2003/0096073 A1 | 5/2003 | Cser et al. | |
| 2003/0099823 A1 | 5/2003 | Lin | |
| 2003/0219574 A1 | 11/2003 | Tomczyk | |
| 2003/0226882 A1 * | 12/2003 | Porchia et al. | 229/403 |
| 2004/0095648 A1 * | 5/2004 | McCannel et al. | 359/619 |
| 2004/0115376 A1 | 6/2004 | Tomczyk | |
| 2004/0157011 A1 | 8/2004 | Raymond et al. | |
| 2004/0263885 A1 | 12/2004 | Tomczyk | |
| 2005/0029337 A1 | 2/2005 | Van Handel | |
| 2005/0053737 A1 | 3/2005 | Raymond et al. | |
| 2005/0087471 A1 * | 4/2005 | Thorlakson | 206/527 |

FOREIGN PATENT DOCUMENTS

| | | |
|---|---|---|
| EP | 1 108 516 | 6/2001 |
| JP | 04027993 A | 1/1992 |
| JP | 20030194891 | 4/2003 |
| JP | 2005221302 | 8/2005 |
| WO | WO 98/32598 | 7/1998 |
| WO | WO 00/09319 | 2/2000 |
| WO | WO 00/63016 | 10/2000 |
| WO | WO 00/75908 | 12/2000 |
| WO | WO 01/73497 | 10/2001 |
| WO | WO 01/96079 A2 | 12/2001 |
| WO | WO01/96079 A2 | 12/2001 |
| WO | WO 02/051611 A1 | 7/2002 |
| WO | WO02/051611 A1 | 7/2002 |
| WO | WO 03/031203 | 4/2003 |
| WO | WO 03/059595 | 7/2003 |

OTHER PUBLICATIONS

File wrapper for copending U.S. Appl. No. 10/472,054, filed Sep. 15, 2003, including all Office communications.

Image File Wrapper for U.S. Appl. No. 10/472,054, Inventor: McCannel, filed Sep. 15, 2003.

Final Office Action dated Oct. 26, 2010 and Response to Final Office Action dated Aug. 2, 2010 for U.S. Appl. No. 10/472,054, filed Sep. 15, 2003. Inventors: Duncan A. McCannel et al. as available at www.uspto.gov.).

Extended EP Search Report dated Aug. 17, 2010 and related communication dated Sep. 3, 2010 for EP Application No. 06751082.6, 5 pages.

Office Action dated Apr. 12, 2011 for EP Application No. 06751082.6, for EP Application No. 06751082.6, 3 pages.

* cited by examiner

FIG. 1

LENTICULAR CONTAINER AND METHOD OF MAKING

RELATED APPLICATIONS

U.S. Ser. No. 09/566,063, now U.S. Pat. No. 7,153,555, issued Dec. 26, 2006, to Raymond, assigned to Taylor Corporation, and entitled "PLASTIC OBJECTS HAVING BONDED LENTICULAR LENS SHEETS"; U.S. Ser. No. 10/406,614, U.S. Patent Application Publication No. 20030219574, published Nov. 27, 2003, now U.S. Pat. No. 6,900,944, issued May 31, 2005, to Tomczyk, assigned to Taylor Corporation, and entitled "LENTICULAR CARD AND PROCESSES FOR MAKING"; U.S. Ser. No. 10/850,470, U.S. Patent Application Publication No. 20040263885, published Dec. 30, 2004, now abandoned, to Tomczyk, assigned to Taylor Corporation, and entitled "INTERLACING METHODS FOR LENTICULAR IMAGES"; and U.S. Ser. No. 10/472,054, to McCannel et al., published May 20, 2004, as U.S. Patent Application Publication No. 20040095648, assigned to Travel Tags, Inc., and entitled "LENTICULAR SLEEVES."

FIELD

The present invention relates to frustoconical, lenticular containers and methods of making the same.

BACKGROUND

Lenticular lenses are well known for use in optical systems to produce various types of unique optical effects. The known lenticular lens systems generally include a transparent sheet having a plane surface on one side thereof and on the other side, a series of parallel longitudinal ridges which can have near-parabolic or circular smooth surfaces creating a multi-lenticular system of convex lenses. An ink layer, print sheet, print medium, or like printed image is generally disposed at the back of the lens adjacent to or on the plane surface. The image layer can contain, for example, an interlaced image having at least two alternate series of spaced image lines, each series of image lines constituting a dissection or breakup of a master picture. The two series of image lines are so optically related with respect to the lens elements as to be alternately visible upon positional change of the viewer with respect to the lenses. When viewed from one position, the first series of image lines are visible so as to display the first composite picture. When viewed from a second position, the second The same lenticular lens system can also be used to produce a three-dimensional image effect. In forming such effects, the two images respectively constitute a right eye view of an object and a left eye view of the same object in normal visual parallax. The lenticular lenses are placed to lie along a line perpendicular to an imaginary line drawn through the two pupils of the eyes of the viewer. In this manner, the convex lenses provide the desired optical effect to divert light rays from the image lines making up the right eye elements of the picture into the right eye of the viewer and, in the same way, the left eye elements of the picture into left eye of the viewer, thereby creating the illusion of three-dimensional vision in the viewer's mind.

Lenticular optical systems have found numerous uses including toys, pins, and other types of articles and devices, such as for teachings devices, wherein questions appear in one view and the answers to these questions appear in the other view; medical devices for viewing changes in x-rays, specimens, photography, printing, and visual aid systems.

A popular application of lenticular image systems has been for use in decorative or informational displays on utility or fanciful articles, such as on containers, packaging, promotional articles, and like applications. One advantage of lenticular image systems when used in display applications is increased customer awareness of and demand for the lenticular associated product. Another advantage of lenticular image systems when used in display applications is customer perception of added-value, for example, a utility article such as a beverage container having lenticular imagery may develop collectable, artistic, sentimental, or like value. Still another advantage of lenticular image systems in display applications is the ability to provide greater image density or multiple-image content per unit area compared to conventional or non-lenticular image displays.

A competitive disadvantage of conventional products having a lenticular display is the need for an underlying support structure, retention structure, or both structures, and the accompanying cost and complexity of the product's manufacture, for example, an injection molded article bearing a lenticular display.

Thus, it is desirable to have lenticular display articles that can overcome the need for underlying structure, and economical methods of making the articles or devices comprising the lenticular displays.

SUMMARY

In general terms, the disclosure relates to lenticular display articles, and methods of making the articles.

One possible aspect of the disclosure is an article having a lenticular display element wherein the lenticular display element is additionally a structural element of the article.

Another possible aspect of the disclosure is an article having a lenticular display element wherein the lenticular display element is structurally self-supporting.

Another possible aspect of the disclosure is an article having a lenticular display element wherein the lenticular display element replaces or is a substitute for a conventional structural element of the article.

Still another possible aspect of the disclosure is an article having a lenticular display element wherein the lenticular display element eliminates the need for one or more support or retention structural elements compared to a conventional article having a lenticular display element mounted thereon.

Another possible aspect of the disclosure is a container comprising: a frustoconical lenticular sidewall which defines a cavity having a first or top end, and a second or bottom end, the sidewall having a seam; and a base attached to the bottom end of the sidewall.

Another possible aspect of the disclosure is an baseless article comprising: a frustoconical lenticular sidewall which defines a cavity having a top end, and a bottom end, the sidewall having a first seam, and a second seam at the bottom end of the sidewall.

Another possible aspect of the disclosure is a method of making an article having a lenticular display element wherein the lenticular display element is additionally a structural element of the article.

Still another possible aspect of the disclosure is a method of making the abovementioned container comprising: forming the frustoconical lenticular sidewall from a lenticular sidewall sheet, the sidewall sheet comprising: a lenticular lens sheet having a first surface having optical ridges and grooves and a second surface opposite the first surface; an image layer on the second surface; and an optional backing layer over the image layer; and affixing the base to the bottom end of the frustoconical lenticular sidewall.

DETAILED DESCRIPTION

Various embodiments of the present disclosure will be described in detail with reference to drawings, if any. Reference to various embodiments does not limit the scope of the disclosure, which is limited only by the scope of the claims attached hereto. Additionally, any examples set forth in this specification are not intended to be limiting and merely set forth some of the many possible embodiments for the claimed invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, the preferred methods and materials are now described. Methods recited herein may be carried out in any order that is logically possible, in addition to a particular order disclosed.

All publications mentioned herein are incorporated herein by reference to disclose and describe the methods and materials in connection with which the publications are cited. The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

The practice of the present disclosure will employ, unless otherwise indicated, conventional techniques of, for example, polymer chemistry, material science, materials processing technology, imaging science, printing technology, and packaging technology, which are within the skill of the art. Such techniques are explained fully in the literature.

The following definitions are provided for specific terms that are used in the following written description.

DEFINITIONS

The following terms are intended to have the following general meanings as they are used herein.

"Frustoconical" refers to any suitable container shape resulting from forming the lenticular lens sheet into a sidewall. In embodiments of the present disclosure, the lenticular lens sheet can be formed into, for example, a cylinder, a tapered cylinder, a cone or conic section thereof, a non-round tapered wall, a non-round straight wall, a tapered or non-tapered square, a tapered or non-tapered rectangle, and like shapes, or combinations thereof.

"Backing layer" or "barrier layer" are synonyms and refer to, for example, a coating, a film, a laminate, an extrusion coating, a fixable liquid coating such as curable or polymerizable compositions, and like covers for the image layer, or combinations thereof. The backing layer or barrier layer can: protect the image layer from distortion or degradation during manufacture; provide an opaque background for the image layer to aid in obtaining or controlling high fidelity color and graphic properties of the lenticular displayed image; and segregate or prevent any interaction or mixing between the image layer components and the container contents in storage or use. In embodiments, where the image layer is comprised of, for example, a polymerizable or radiation curable ink or like materials, a separate backing layer or barrier layer may be redundant and unnecessary. Thus, depending upon the intended use or application of the container, the container can be manufactured with, for example, curable inks that provide both graphic or image elements in addition to barrier layer elements, and without the need for a separate backing or barrier layer. The curable inks can be selected and formulated to provide image elements and barrier layer elements that are opaque, translucent, transparent, or combinations thereof. "Backing layer" or "barrier layer" can also refer to a "core layer," for example, in the case of a double-sided lenticular sidewall or lens sheet.

"Second surface side" such as in the phrase "an image layer on the second surface side of the lenticular lens sheet" refers the side where the image layer is located. The image layer can be, but need not be, printed on the lenticular lens sheet. The image layer can be, for example, printed on or provided to the backing layer or barrier layer if present, and subsequently combined with the lenticular lens sheet to form the lenticular sidewall sheet. Thus, for example, the image layer can be printed on the lenticular lens sheet, the backing layer, or both. In embodiments, an optional binder layer, adhesive layer, primer layer, and like layers, can be interposed between any of the lenticular lens sheet, image layer, or backing layer.

The singular forms "a", "and", and "the" include plural referents unless the context clearly dictates otherwise. Thus, for example, reference to "a seam" can include a plurality of such seams and reference to "a seam" can include reference to one or more seams and equivalents thereof known to those skilled in the art.

"About" modifying, for example, the quantity of an ingredient in a composition, concentrations, volumes, process temperatures, pressures, process times, dwell times, recoveries or yields, flow rates, and like values, and ranges thereof, employed in describing the embodiments of the disclosure, refers to variation in the numerical quantity that can occur, for example, through typical measuring and handling procedures; through inadvertent error in these procedures; through differences in the ingredients or materials used to carry out the methods; and like proximate considerations. The term "about" also encompasses amounts that differ, for example, due to aging of a formulation with a particular initial concentration or mixture, amounts that differ due to mixing or processing a formulation with a particular initial concentration or mixture, dimensions such as thickness that may differ due to the effect of temperature on materials, and like considerations. Whether modified by the term "about" the claims appended hereto include equivalents to these quantities.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

I have discovered that lenticular display elements can be directly fashioned into articles or devices. The resulting articles or devices having a structural lenticular display element have unexpectedly robust structural quality and aesthetic characteristics, in addition to reduced weight and cost of manufacture. The resulting articles or devices having a structural lenticular display element, if desired, can be made continuously, in high volume, at high speeds, and without the need for more complex or costly manufacturing processes or machinery, such as injection molding equipment and materials.

Figure 1:
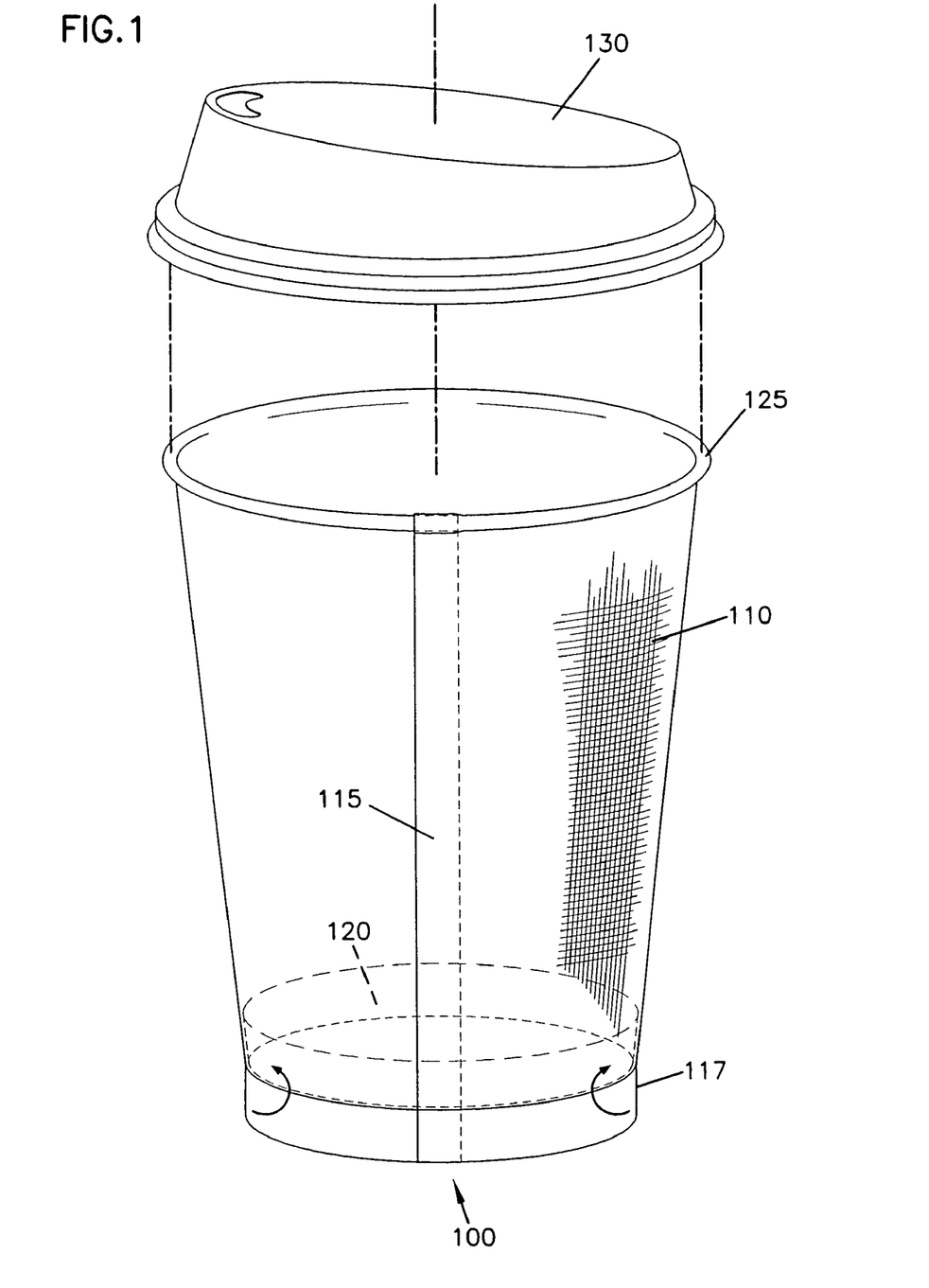
FIG. 1 illustrates a perspective view of an exemplary container article, in embodiments of the present disclosure.

Referring to the Figures, FIG. 1 illustrates a perspective view of an exemplary container article. FIG. 1 illustrates an embodiment of a container article 100, such as a beverage cup. The container article 100 can serve as a package for storing, dispensing, consuming, or otherwise using solid or liquid product contents, such as yogurt, popcorn, candy, beverages, soil and seed mixtures, paint, nails, and like substances and applications.

In embodiments, the container 100 can comprise, for example, a frustoconical lenticular sidewall 110, which defines an internal cavity having a top end, and a bottom end. The formed lenticular sidewall can have a seam 115, or similar manner of connection or construction, such as an overlap- or lap-type seam of opposite edges of a pre-formed lenticular image member rolled sheet (e.g., on a mandrel or like methods). In embodiments, the seam can preferably be a single overlap of opposite ends of the sidewall and the seam can preferably be a heat seal. In embodiments, the lenticular sidewall of the container preferably has a single overlapping heat-sealed seam, such as a melt of a portion of the overlapping or abutting sidewall portions. In embodiments, the seam is preferably free of an additional adhesive. In embodiments, the lenticular sidewall of the container preferably has a single seam and preferably has a single wall construction, that is, a lenticular sidewall that can provide a unitary or one-piece wall structure and can be free of second underlying support structure such as a second or adjacent sidewall. A container of the present disclosure having a lenticular sidewall having the abovementioned unitary or one-piece wall structure can be advantaged in embodiments, by for example, higher speed of manufacture, fewer materials, fewer steps, lower defect and reject rates, lower unit-cost, and like considerations. In embodiments, the thickness of a one-piece lenticular sidewall can be, for example, from about 1 to about 50 mils, from about 2 to about 25 mils, from about 5 to about 20 mils, and from about 8 to about 18 mils.

The cavity of the container 100 can be closed or sealed at one end with, for example, a base 120 attached to the bottom end of the sidewall. The base can be attached internally or externally to the sidewall by, for example, a heat seal between the sidewall and a base member such as a pre-cut plastic sheet, or like methods. The base preferably can be recessed (as shown) within the cavity, that is, the base is recessed within a portion of the interior of the cavity and seals the bottom end of the cavity to provide, for example, superior strength and aesthetics. The lenticular sidewall 115 can optionally have a foldable seam region 117 that can be folded, wrapped, or similarly deformed within (i.e., internally, as shown) or about (i.e., externally, not shown) the cavity and adapted to receive the base 120. The foldable seam, whether within or about the cavity can also provide, for example, superior strength and aesthetics.

The shape and size of the container will depend, for example, on the intended use, materials of construction, desired properties, service life, biodegradability, and like considerations. The shape of the container can be, for example, a cylinder, a tapered cylinder, a non-round tapered cylinder, a non-round straight wall, and like shapes, or combinations thereof. Other container shapes and product configurations are within the scope of the present disclosure, for example, a "toothpaste-tube" like container having an open end, with or without a closure or lid for retaining or dispensing the container contents, and a baseless opposite end, for example, a pinched-end seal which closes or seals the bottom end. Thus, in embodiments, the present disclosure provides an article comprising: a frustoconical lenticular sidewall which defines a cavity having a top end, and a bottom end, the sidewall having a first seam, and a second seam at the bottom end of the sidewall. The frustoconical lenticular sidewall can be, for example, a lenticular lens sheet having a first surface having optical ridges and grooves and a second surface opposite the first surface; an image layer on the second surface; and an optional separate backing layer over the image layer. The image layer can be, for example, a printed interlaced image. The lenticular lens sheet preferably has the lens bearing first surface on the exterior of the article or container to provide the greatest visibility of image elements to the consumer or user.

The backing layer can be constructed of any suitable material, such as a compatible plastic, which plastic can be the same or different from the plastic materials used to make the lenticular lens sheet or base. In embodiments, the backing or barrier layer can be selected to provide structural reinforcement or a structural support to the sidewall. In preferred embodiments, the backing or barrier layer can be selected to provide properties other than, or independent of, substantial structural reinforcement or structural support layer to the sidewall, for example, to provide thermal insulation or conduction properties, or thermal protective properties. Thermal insulation or thermal protective properties can include for example: retaining or maintaining the temperature of container contents such as in beverage cups or foodstuff containers (i.e., hot or cold); protecting the image or ink layer or the sidewall from distortion caused by temperature extremes or excursions during manufacture, transport, or use; protecting a user or handler of the container from temperature content extremes during use, and like protective properties. In embodiments, the thickness of a backing or barrier layer if present can be, for example, from about 0.01 to about 50 mils, from about 0.01 to about 25 mils, from about 0.1 to about 10 mils, and from about 0.2 to about 5 mils, where mil is equal to $1/1000$ inch.

In embodiments, a container of the present disclosure can optionally include an outwardly (i.e., away from the cavity) curled rim 125 or rolled lip on the top end of the sidewall cavity. The container can also optionally include a closure, such as a removable lid 130, over the top end of the cavity, for example, engaging the top-end edge of the lenticular sidewall or the rolled lip. The removable lid 130 can optionally include or be fashioned from a lenticular display element. In embodiments, a container of the present disclosure is preferably self-supporting with or without a base attached, and additionally or alternatively, a container of the present disclosure is preferably self-supporting with or without an optional backing layer or base layer. In embodiments, a container of the present disclosure can be nested for compact stacking, storage, shipping, or like considerations. In embodiments, a container of the present disclosure, where a closure or lid is included can be, for example, stacked for storage, shipping, or display purposes. In embodiments, the base, the optional closure, the optional lid, can be made of metal or resin coated metals, such as tinplate, i.e., a thin sheet iron or steel coated with tin, stamped aluminum, and like metal formulations. Attachment of a metal base, metal closure, or metal lid, to the sidewall can be accomplished by way of any suitable method such as crimping, gluing, and like fastening methods.

In embodiments, the present disclosure provides a method of making an article or device having a lenticular display element, such as the abovementioned container by, for example:

forming the frustoconical lenticular sidewall from a lenticular sidewall sheet, the sidewall sheet can include, for example:

a lenticular lens sheet having a first surface having optical ridges and grooves and a second surface opposite the first surface;

an image layer on the second surface; and a backing layer over the image layer;

and affixing the base to the bottom end of the frustoconical lenticular sidewall.

Figure 2:
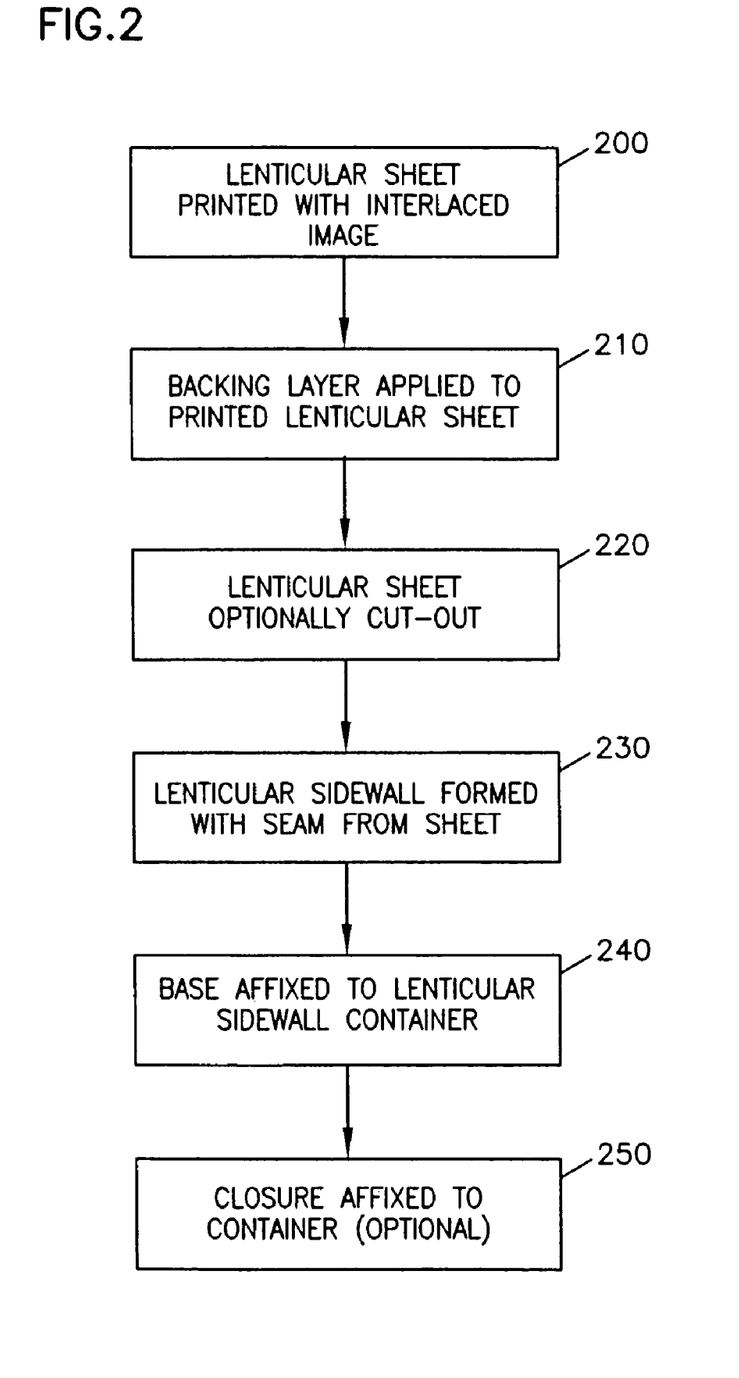
FIG. 2 is a flow chart of exemplary steps and optional steps in a method of making the container article of FIG. 1, in embodiments of the present disclosure.

FIG. 2 is a flow chart of exemplary steps and optional steps in a method of making the abovementioned container article of FIG. 1, or like container articles. The lenticular sidewall sheet, that is a "blank" including its graphic image content, can be prepared by methods known in the art, such as disclosed in the above mentioned U.S. Patent Publications 20030219574 or 20040263885. See for example steps 200, 210, and 220. Additionally or alternatively, the lenticular sidewall sheet products are provided as commercially available or can be custom manufactured by vendors, such as Travel Tags/Xtreme Graphics, Inver Grove Heights, Minn. Formation of the frustoconical lenticular sidewall 230 can be accomplished by, for example, joining overlapping opposite ends of the lenticular sidewall sheet with a heat seal to form the seam. Similarly, affixing the base to the bottom end of the frustoconical lenticular sidewall 240 can be accomplished by, for example, a heat seal of the base to the sidewall. The joining of the sidewall, the affixing of the base, or both, can be accomplished manually or preferably by high-speed automated machinery. High-speed automatic joining and affixing machinery is commercially available from, for example, the Paper Machinery Corporation, Milwaukee, Wisc., see www.papermc.com. The joining and affixing stages of the method of the present disclosure can be accomplished by providing, for example, a pre-formed and pre-cut lenticular blank of appropriate dimensions and having the desired lenticular graphics to, for example, a Paper Machinery Corporation Model PMC 1300P or a PMC 1002P plastic container forming machine, see for example, U.S. Pat. Nos. 6,790,168, 6,652,435, 6,382,449, 5,752,907, 2,942,530, and U.S. Patent Publication 20020111260. A closure structure, such as a lid or a tamper-resistant or tamper-evident top seal, or like structures, can optionally be affixed 250 to the container, with or without an intermediate container fill step. In general, the high speed cup making machine takes blanks from a feeder, wraps the blanks individually around a mandrel, then transfers the wrapped blank to another station which blows hot air, from a top position and a bottom position, on the two overlapping portions of the blank at approximately 700° C. (1,300 degrees Fahrenheit). The machine then folds the blanks around the mandrel and a pressure foot comes down and holds the two ends against each other for a very short time until the two surfaces are bonded to each other forming a heat-sealed seam. This type of machine can be modified to use other methods of bonding such as an adhesive, or like bonding methods if desired.

It should be recognized that the specific method and article embodiments discussed above are by way of example, and various other embodiments are encompassed by the present disclosure. For instance, other methods for forming the frustoconical or alternatively shaped or sized lenticular sidewall component can be accomplished by, for example, joining with a heat seal, an adhesive, a sonic weld, or combinations thereof, of overlapping opposite edges of the lenticular sidewall sheet to form the seam, joining opposite puzzle cut edges of the lenticular sidewall sheet to form the seam, joining opposite puzzle cut edges with a heat seal, an adhesive, a sonic weld, and like methods, or combinations thereof. In embodiments, the lenticular sidewall, prior to or after forming into a sleeve or container, is preferably constructed free of an adhesive to, for example, reduce manufacture cost and complexity, and to eliminate or minimize possible contamination of the container contents from a properly or improperly applied adhesive when the container is filled. Additionally, the lenticular lens pattern can be oriented horizontally, vertically, intermediate values between horizontal and vertical, or combination thereof.

The curled rim or curled lip of the top end of the frustoconical lenticular sidewall can also optionally be accomplished manually, or preferably automatically, concurrent with or subsequent to the abovementioned joining and affixing steps.

The method can be readily modified to provide a variety of shapes and sizes of product containers or articles having a lenticular sidewall structure as disclosed and illustrated herein. Thus, the method of making of the present disclosure can be used to prepare lenticular display articles or lenticular decorated articles where the lenticular piece is an integral and continuous structural component of at least one of the container's walls such as, beverage cups, ice cream cartons, gift or toy box packaging, and like articles.

While the present disclosure has been described with reference to the specific embodiments thereof, it should be understood by those skilled in the art that various changes may be made and equivalents may be substituted without departing from the true spirit and scope of the disclosure. In addition, many modifications may be made to adapt a particular situation, material, composition of matter, process, process step or steps, to the objective, spirit and scope of the present disclosure. All such modifications are intended to be within the scope of the claims appended hereto.

EXAMPLES

The following examples serve to more fully describe the manner of using the above-described disclosure, as well as to set forth the best modes contemplated for carrying out various aspects of the disclosure. It is understood that these examples in no way serve to limit the true scope of this disclosure, but rather are presented for illustrative purposes. The percentages, if any, used in the Examples are by weight per weight (w/w) or weight percentage of the recited component of the total weight.

Example 1

A pre-formed and pre-cut lenticular sidewall blank is prepared in accordance with, for example, the abovementioned U.S. Pat. No. Publications 20030219574 or 20040263885. The lenticular sheet can be, for example, clarified polyethylene, clarified polypropylene, and like grades of polymers or resins, which resins or materials are preferably more flexible or conformable when heated than when at room temperature. The image elements can be any desired markings including for example, text, graphic, and like markings, or combinations thereof. The optional backing layer over the image layer can be, for example, any suitable material that permits suitable forming into a suitable lenticular sidewall sleeve from the blank, suitable joining of a seam, and suitable affixing of a base thereto. Suitable materials include, for example, natural or synthetic polymeric materials such as resin, plastic, paper, and like materials, or combinations thereof. The optional backing layer, when present, is preferably selected for it desired structural and functional properties, such as sufficient rigidity to provide a robust container, sufficient flexibility to avoid pre-mature container breakage, sufficient impermeability to contain a particular content for a period of time without leaks or seepage, sufficient compatibility with the image or ink layer, and like properties, or combinations thereof.

Example 2

A 45 minutes supply, for example, about 10,000 to 15,000 piece count, of pre-formed and pre-cut lenticular sidewall blanks of Example 1, is provided to a PMC Model Number 1300P or 1002P plastic container forming machine. The machine is operated under the manufacturer's recommended conditions or as dictated by the material properties of particular lenticular sidewall blanks and base components selected for assembly. The frustoconical lenticular sidewall, or an alternatively shaped or sized lenticular sidewall component, can be formed by, for example, joining opposite ends or edges of a lenticular sidewall blank with a heat seal. The base can also be attached or affixed to the resulting lenticular sidewall by, for example, joining with a heat seal. The resulting containers are suitable for their intended use and as disclosed and illustrated herein.

The entire disclosure for publications, patents, and patent documents are incorporated herein by reference, as though individually incorporated by reference. The disclosure has been described with reference to various specific embodiments and techniques. Additional aspects of the disclosure are additionally described and illustrated in the Figure(s) provided, if any. However, it should be understood that many variations and modifications are possible while remaining within the spirit and scope of the disclosure.

The claimed invention is:

1. A container comprising:
   a unitary frustoconical lenticular sidewall consisting essentially of a lenticular sidewall sheet joined to itself to form a seam, the lenticular sidewall defining a cavity having a top end and a bottom end,
   wherein a rolled lip is integrally formed from the lenticular sidewall at the top end of the cavity, the rolled lip extending outwardly from the cavity towards the lenticular sidewall,
   wherein a folded seam region is integrally formed from the lenticular sidewall at the bottom end of the cavity, the folded seam region folding within the cavity, and
   wherein the lenticular sidewall sheet includes—
      a lenticular lens sheet having a first lenticular surface and a second surface opposite the first lenticular surface,
      an image layer proximate the second surface and viewable through the lenticular lens sheet, and
      a backing layer over the image layer; and
   a base attached proximate the bottom end of the cavity.

2. The container of claim 1, wherein the base is recessed within a portion of the interior of the cavity above the folded seam region and seals the bottom end of the cavity.

3. The container of claim 1, wherein a shape of the container comprises a cylinder, a tapered cylinder, a non-round tapered cylinder, or a non-round straight wall.

4. The container of claim 1, wherein the image layer comprises an interlaced image printed on the second surface of the lenticular lens sheet, printed on the backing layer, or combinations thereof.

5. The container of claim 1, wherein the seam comprises opposite ends of the lenticular sidewall sheet heat-sealed to one another.

6. The container of claim 5, wherein the seam comprises an overlap of opposite ends of the lenticular sidewall sheet to one another.

7. The container of claim 5, wherein the lenticular lens sheet and the backing layer are compatible with one another.

8. The container of claim 5, wherein the lenticular lens sheet is selected from polyethylene and polypropylene.

9. The container of claim 5, wherein the backing layer comprises a polymeric material.

10. The container of claim 8, wherein the lenticular lens sheet and the backing layer comprise the same material.

11. The container of claim 1, further comprising an adhesive layer between the image layer and the backing layer.

12. A method of making a container, the method comprising:
   providing a lenticular sheet, the lenticular sheet including
      a lenticular lens sheet having a first surface having a lenticulated region including optical ridges and grooves, and a second surface opposite the first surface,
      an image layer proximate the second surface side of the lenticular lens sheet, and
      a backing layer over the image layer;
   forming a frustoconical lenticular sidewall from the lenticular sheet by affixing opposite ends of the lenticular sheet to one another to form a seam;
   folding a bottom end of the frustoconical lenticular sidewall inwardly to form a folded seam region;
   affixing a base to the bottom end of the frustoconical lenticular sidewall at a position above the folded seam region; and
   rolling a top end of the frustoconical lenticular sidewall to form a rolled lip integral with the frustoconical lenticular sidewall, wherein the rolled lip extends outwardly from the cavity towards the frustoconical lenticular sidewall,
   wherein the image layer is free from distortion after the seam has been formed.

13. The method of claim 12, wherein forming the seam comprises joining overlapping opposite ends of the lenticular sheet with a heat seal to form the seam.

14. The method of claim 12, wherein the method is accomplished on a high-speed cup making machine.

15. The method of claim 12, wherein the lenticular lens sheet and the backing layer comprise the same material.

16. The method of claim 15, wherein the lenticular lens sheet and the backing layer comprise polypropylene.

17. The method of claim 12, further comprising applying an adhesive to the sidewall between the image layer and the backing layer.

18. A container comprising:
   a unitary frustoconical sidewall having opposite ends joined to one another to define a cavity having a top opening and a bottom opening; and
   a base attached to the bottom opening;
   wherein a rolled lip is integrally formed from the lenticular sidewall at the top opening of the cavity, the rolled lip extending outwardly from the cavity towards the lenticular sidewall, wherein a folded seam region is integrally formed from the lenticular sidewall at the bottom opening of the cavity, the folded seam region folding within the cavity, wherein the sidewall consists essentially of (a) an outer lens surface, (b) an inner lens surface, (c) an image layer proximate the inner lens surface, and (d) a backing layer over the image layer, and wherein the outer lens surface consists essentially of a lenticular surface.

19. A self-supporting container comprising a unitary frustoconical sidewall that defines a cavity having a first end and a second end wherein of the first and second ends is closed, the closed end comprising a folded seam region integrally formed from the lenticular sidewall, and a base positioned within the cavity above the folded seam region, wherein the other of the first and second ends comprises a rolled lip integrally formed from the sidewall, the rolled lip extending outwardly from the cavity towards the lenticular sidewall, and wherein the sidewall consisting essentially of (a) an outer lenticular lens surface, (b) an inner lens surface, (c) an image layer proximate the inner lens surface, and (d) a backing layer over the image layer.

20. A container comprising:

a unitary frustoconical sidewall consisting essentially of a sidewall sheet including a plurality of lenses, the sidewall sheet being joined to itself to form a seam thereby defining a cavity having a top end and a bottom end, wherein a rolled lip is integrally formed from the sidewall at the top end of the cavity, the rolled lip extending outwardly from the cavity towards the lenticular sidewall, wherein a folded seam region is integrally formed from the lenticular sidewall at the bottom end of the cavity, the folded seam region folding within the cavity, and wherein the sidewall sheet includes a lens sheet having a first surface including the plurality of lenses, and a second surface opposite the first surface, an image layer proximate the second surface and viewable through the lens sheet, and a backing layer over the image layer; and a base attached proximate the bottom end of the cavity.

* * * * *

UNITED STATES PATENT AND TRADEMARK OFFICE
CERTIFICATE OF CORRECTION

| | | |
|---|---|---|
| PATENT NO. | : 8,009,359 B2 | Page 1 of 2 |
| APPLICATION NO. | : 11/409284 | |
| DATED | : August 30, 2011 | |
| INVENTOR(S) | : McCannel et al. | |

It is certified that error appears in the above-identified patent and that said Letters Patent is hereby corrected as shown below:

Title Page, Item (57):
Under ABSTRACT delete "can includes" and insert -- includes --.

Page 2:
Under FOREIGN PATENT DOCUMENTS, delete the second occurrence of "WO WO01/96079 A2 12/2001" and the second occurrence of "WO WO02/051611 A1 7/2002".

Page 2:
Under OTHER PUBLICATIONS, delete "gov.)." and insert -- gov. --.

Column 1, line 48:
After "the second" insert -- . --.

Column 2, line 43:
Delete "lenficular" and insert -- lenticular --.

Column 4, line 21:
After "refers" insert -- to --.

Column 7, line 50:
"250" should be bolded.

Column 8, line 17:
Delete "combination" and insert -- combinations --.

Column 9, line 7:
Delete "it" and insert -- its --.

Signed and Sealed this
Fourteenth Day of February, 2012

David J. Kappos
*Director of the United States Patent and Trademark Office*

CERTIFICATE OF CORRECTION (continued)
U.S. Pat. No. 8,009,359 B2

<u>Column 11, line 12</u>:
After "wherein" insert -- one --.